United States Patent [19]
Takashima

[11] 3,795,809
[45] Mar. 5, 1974

[54] SCANNING ELECTRON MICROSCOPE WITH CONVERSION MEANS TO PRODUCE A DIFFRACTION PATTERN

[75] Inventor: Susumu Takashima, Tokyo, Japan

[73] Assignee: Nihon Denshi Kabushiki Kaisha, Akishima-shi, Japan

[22] Filed: Sept. 15, 1972

[21] Appl. No.: 289,425

[30] Foreign Application Priority Data
Sept. 21, 1971 Japan.............................. 46-73581

[52] U.S. Cl. ................. 250/311, 250/306, 250/397
[51] Int. Cl........................ H01j 37/26, G01n 23/20
[58] Field of Search.... 250/49.5 A, 49.5 E, 49.5 ED

[56] References Cited
UNITED STATES PATENTS
2,802,110   8/1957   Kazato et al....................... 250/49.5
3,180,986   4/1965   Grigson............................. 250/49.5

OTHER PUBLICATIONS
"High–Voltage Transmission Scanning Electron Microscopy", by Jim Cowley, from J. Appl. Cryst., Vol. 3, Pt. 2, 1970, pages 49–58.

*Primary Examiner*—William F. Lindquist
*Attorney, Agent, or Firm*—Webb, Burden, Robinson & Webb

[57] ABSTRACT

A scanning electron microscope capable of displaying a selected area diffraction pattern of a crystal specimen which corresponds exactly with the selected area of the scanning electron microscope image. The microscope has a field limiting aperture disposed between two adjustable condenser lenses near a specimen and scanning deflecting coils disposed above said aperture.

6 Claims, 7 Drawing Figures

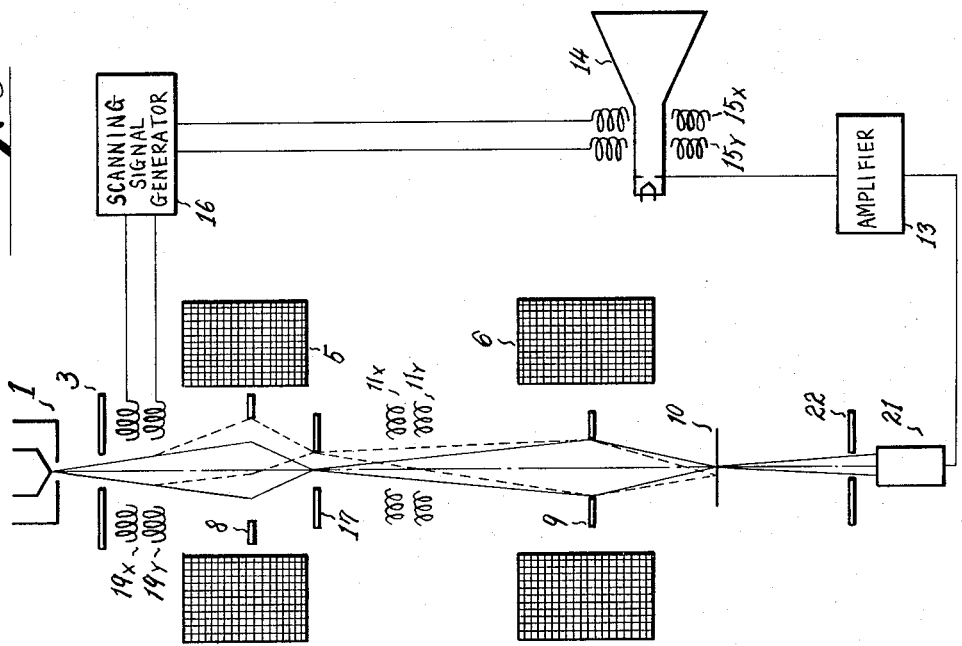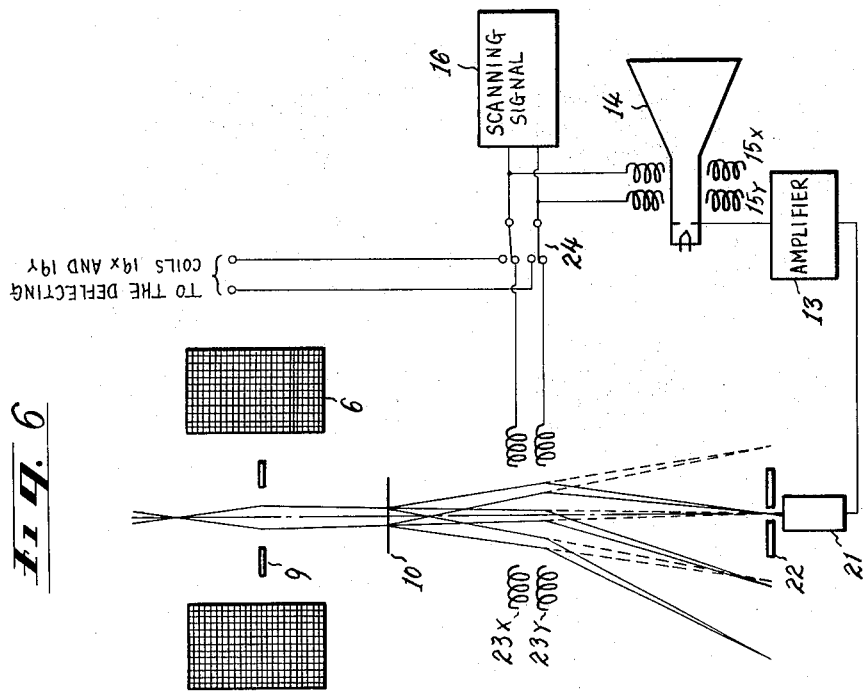

SCANNING ELECTRON MICROSCOPE WITH CONVERSION MEANS TO PRODUCE A DIFFRACTION PATTERN

This invention relates to a scanning electron microscope capable of readily displaying a selected area diffraction pattern which corresponds exactly with the selected area of the scanning electron microscope image.

When observing crystal specimens using an electron microscope, it is very important to be able to analyze the selected area diffraction pattern corresponding to any selected area of the electron microscope image.

However, with scanning electron microscopes thus far available, it is very difficult to achieve the above correspondence with a high degree of accuracy.

An object of this invention, therefore, is to lessen the above difficulty by incorporating a field limiting aperture between two condenser lenses near the specimen and incorporating a beam deflecting means above said field limiting aperture.

Further features and other objects and advantages will become apparent from a study of the following detailed description in conjunction with the accompanying drawings in which.

Figure 1:
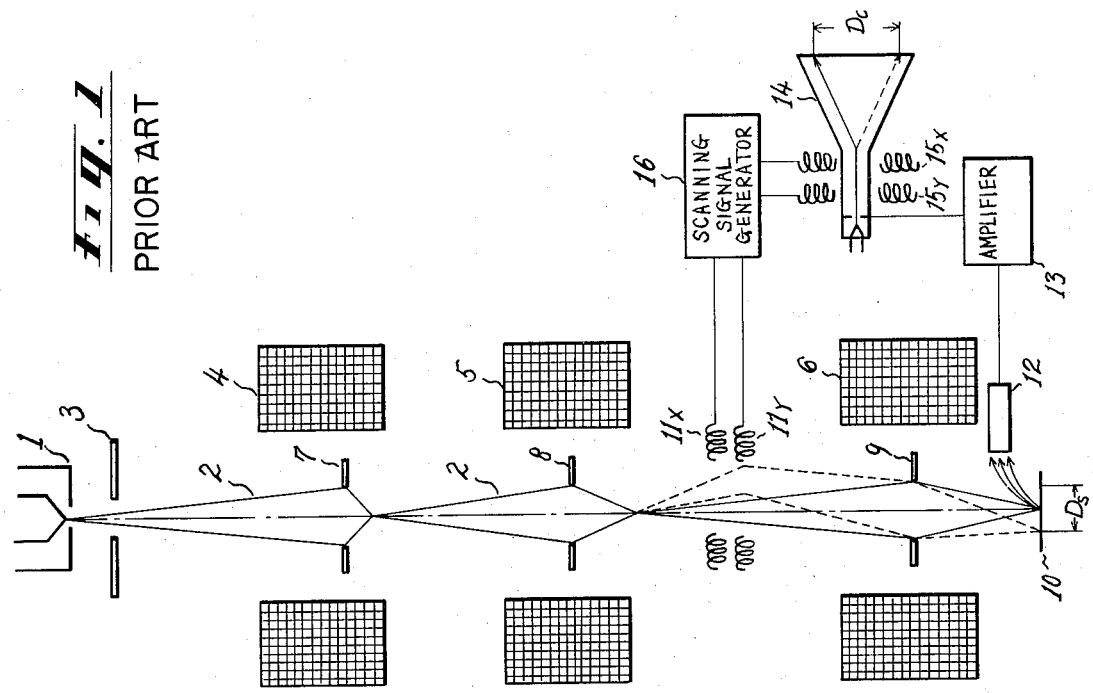
FIGS. 1 and 2 are schematic diagrams showing the conventional scanning electron microscope.

A conventional scanning electron microscope capable of observing a scanning electron microscope image and a diffraction pattern embodies a condenser lens system, for example, as shown in FIG. 1. An electron gun 1 generates an electron beam 2 which is accelerated by an anode 3. The beam is condensed by the condenser lens system consisting of lenses 4, 5 and 6 having the apertured baffles 7, 8 and 9 respectively. In order to observe a scanning microscope image, the condensed electron beam is focused on the surface of the specimen 10 and then scanned over the specimen surface by means of scanning deflecting coils 11x and 11y. The electrons thus excite secondary electrons and backscattered electrons. These electrons are detected by an electron detector 12. A detector signal is amplified by an amplifier 13 and then applied to the control grid of a cathode ray tube 14 in order to modulate the brightness of the tube. Deflecting coils 15x and 15y carry a scanning signal supplied by a scanning signal generator 16, said scanning signal being synchronized to that applied to the scanning deflecting coils 11x and 11y. Accordingly, a scanning microscope image of the specimen 10 is displayed on the screen of the cathode ray tube 14. Moreover, in this case, the image magnification $M$ is determined by the ratio of the scanning width $Dc$ of the cathode ray tube 14 to the electron probe scanning width $Ds$ on the specimen surface.

Figure 2:
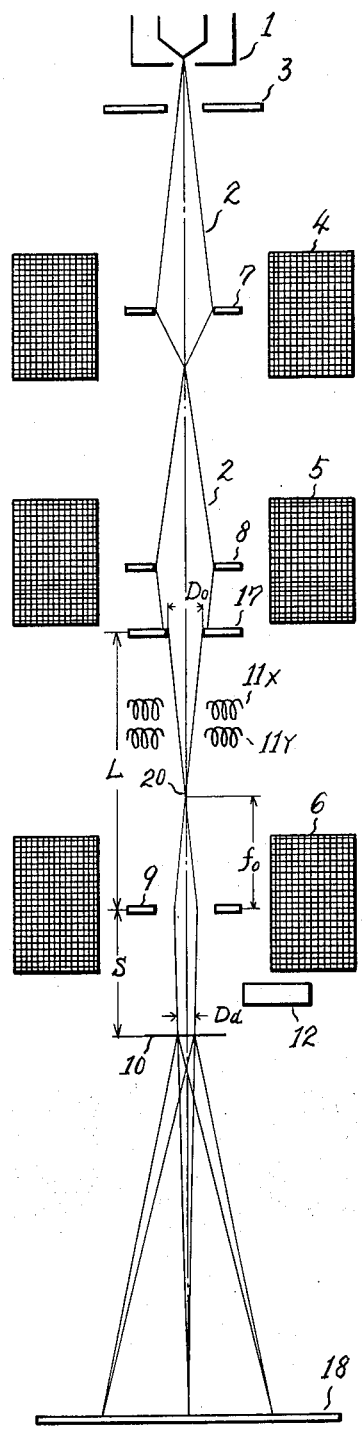

In order to form a diffraction pattern, it is necessary to vary the focal length of the second condenser lens 5 and the final condenser lens 6 by adjusting the lens currents as shown in FIG. 2 in accordance with the following equation:

$$1/L + 1/S = 1/f_o$$

1.

where L is the distance between the principal plane of the lens 6 and the field limiting aperture 17, $f_o$ is the focal length of the lens 6 and $S$ is the distance between the specimen and the principal plane of the lens 6. A field limiting aperture 17 is utilized for the necessity of limiting the width of the electron beam. Under this condition the following equation is established:

$$Dd = S/L \cdot D_o$$

2.

where $Dd$ is the width of the electron beam irradiating the specimen surface and $D_o$ is the diameter of the aperture 17. By so doing, a well paralleled beam of electrons irradiates the specimen and forms a diffraction pattern on a fluorescent screen 18 or a photographic plate.

In the above-mentioned arrangement, however, there is no direct relationship between the limiting field diffraction pattern and the scanning microscope image. Namely, there is no direct relationship between the beam scanning width $Ds$ and the width $Dd$ of the beam impinging the specimen surface. Such being the case, the microscopist is required to calculate $Dd$ utilizing equation 2 and then assess the selected viewing area ($M \times Dd^2$) at the center of the microscope image.

In so doing, however, it is assumed that the field of view corresponds with the irradiation field of the diffraction pattern. But this assumption does not always hold good. Moreover, if the field limiting aperture happens to move off center with respect to the optical axis of the microscope, in the amount $\Delta$, the field of view also shifts in the amount $S/L\Delta$ of which the microscopist is unaware.

Figure 3:
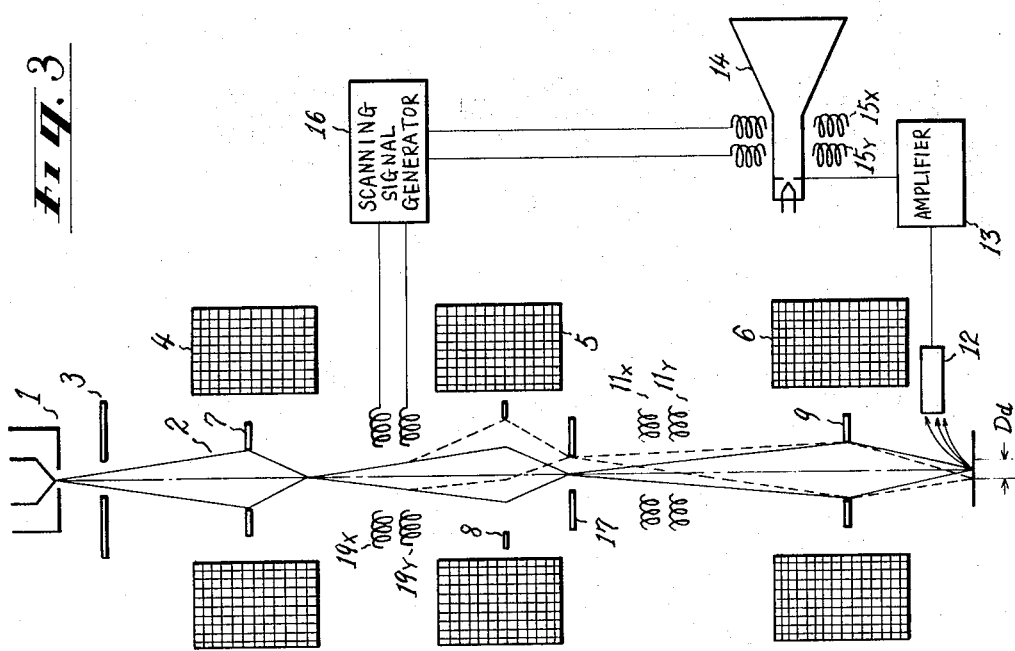
FIGS. 3 and 4 are schematic diagrams showing one embodiment of this invention; and, FIGS. 5 to 7 are schematic diagrams showing three other embodiments of this invention.
Figure 4:
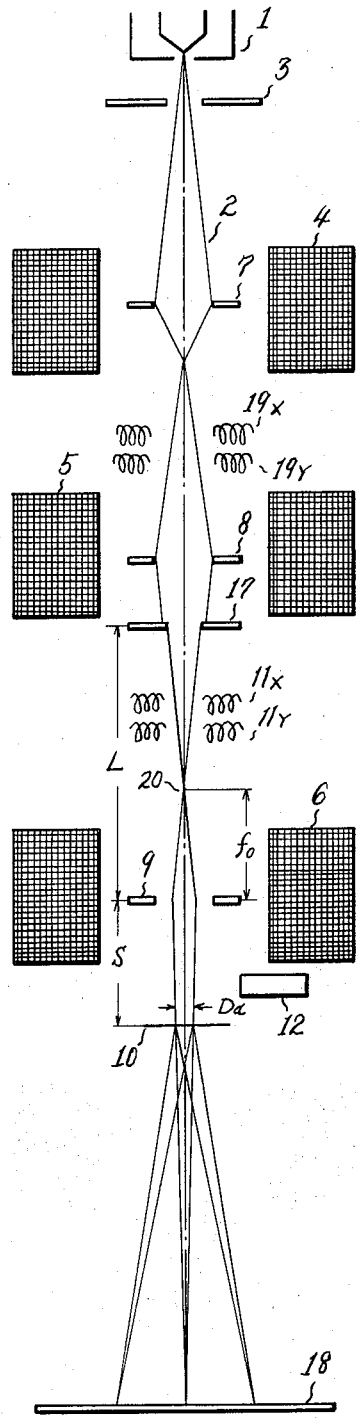

In the scanning electron microscope according to this invention, the deflecting coils 19x and 19y are placed above the field limiting aperture plate 17 as shown in FIGS. 3 and 4 in addition to the coils 11x and 11y placed between condenser lens 5 and 6.

FIG. 3 is a schematic diagram of one embodiment of this invention showing the electron beam path necessary for observing a selected field microscope image. Referring to the figure, the scanning coils 19x and 19y scan the electron beam over the field limiting aperture 17 on which the beam is focused by the condenser lens 5. Namely, the focal length of the condenser lens 5 is controlled so that the shadow image of the field limiting aperture 17 is displayed clearly on the screen of the cathode ray tube 14. Next, the focal length of the condenser lens 6 is adjusted so that the selected field microscope image inside the aperture shadow is in focus. In the embodiment in question, the scanning width $Dd$ of the electron beam on the specimen surface is determined by the diameter of the aperture 17 and is not restricted by the deflection current of the scanning coils 19x and 19y. Equation (1) is also satisfied. Next, in order to observe a diffraction pattern corresponding to the obtained selected field image, the focal length of the second condenser lens 5 is varied as shown in FIG. 4. Under the condition as shown in the figure, the deflection current applied to coils 19x and 19y is zero and the focal length of the condenser lens 5 has been increased so that the image forming position 20 of the condenser lens 5 coincides with the object position of the lens 6. That is to say, the image focusing position 20 is apart from the principal plane of the lens 6 by distance about $f_o$. Precise adjustment of the focal length is achieved by monitoring the diffractin pattern on the screen 18 until the sharpest pattern is obtained. During the above adjustment, the focal length of the lens 6 is kept at the same value.

FIG. 5 shows another embodiment of this invention in which the scanning microscope image is displayed on the screen of the cathode ray tube 14 by utilizing the electron beam transmitted through the specimen. In this case the electron detector 21 and its aperture 22 are located below the specimen and the condenser lens 4 is not used.

FIG. 6 shows another embodiment of this invention in which the diffraction pattern is displayed on the screen of the cathode ray tube 14 by means of deflecting coils 23x and 23y, the electron detector 21 and the detection aperture 22. In this case, the deflecting coils 23x and 23y, which are arranged between the specimen and the detector 21, are supplied with a scanning signal from the generator 16 via a changeover switching means 24. Consequently, the deflecting coils deflect the entire diffraction pattern over the aperture 22 and the diffraction pattern is displayed on the screen of the cathode ray tube 14. If the switching means 24 is switched over, the scanning microscope image can be displayed on the screen of said cathode ray tube 14 by adjusting the focal length of the lens 5.

Figure 7:
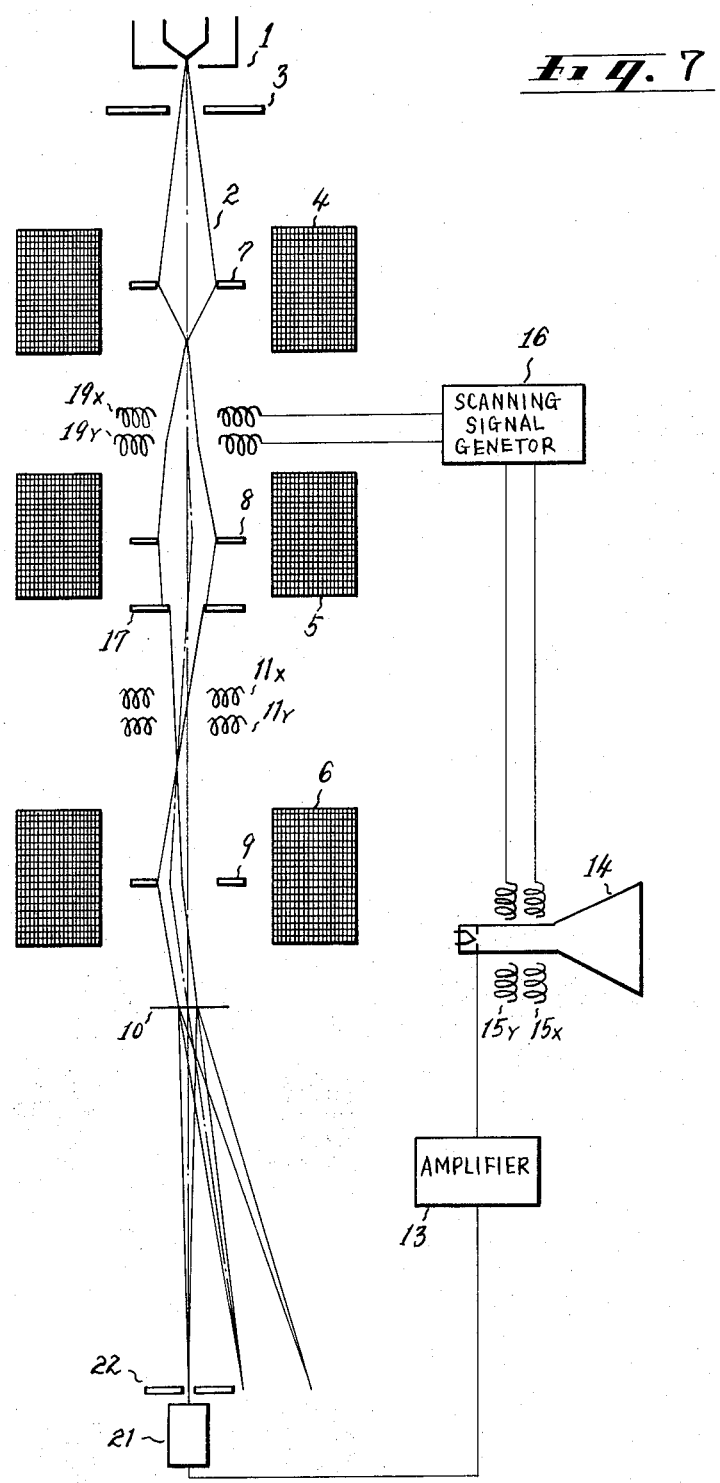

FIG. 7 shows yet another embodiment of this invention in which the scanning coils 19x and 19y are used in order to obtain the diffraction pattern. In this embodiment, a scanning signal from the generator 16 is applied to the scanning coils 19x and 19y so as to vary the inclination and azimuth angle of the electron beam for irradiating the specimen. By so doing, the same diffraction pattern displayed in the embodiment shown in FIG. 6 is displayed on the screen of the cathode ray tube 14.

Having thus described the invention with the detail and particularity as required by the Patent Laws, what is desired protected by Letters Patent is set forth in the following claims.

I claim:

1. In a scanning electron microscope, means for producing conventional scanned images and alternately producing diffraction patterns of the scanned area on the specimen surface comprising:
   A. a column for housing the microscope;
   B. an electron gun at one end of the column for emitting an electron beam;
   C. A condenser lens system within said column for focusing the electron beam comprising at least two lenses;
   D. a field limiting baffle having an aperture therein arranged between two of said lenses;
   E. a specimen holder for positioning a specimen in the path of the electron beam focused by the condenser lens system;
   F. a scanning deflection means for causing the electron beam to scan over the specimen surface, said deflection means positioned between the electron gun and the baffle thereby limiting the field scanned;
   G. means for detecting backscattered electrons, secondary emissions and/or transmitted electrons and means synchronized with the scanning deflection means for displaying a conventional scanning microscope image;

means for converting the microscope from a scanning to a diffraction mode comprising;
   H. means for focusing the electron beam on the back focal plane of the last condenser lens in the column and thereby causing a collimated electron beam to irradiate the same surface scanned;
   I. means on the side of the specimen opposite the electron gun for detecting the diffraction pattern; and,
   J. means for displaying the diffraction pattern.

2. An apparatus as described in claim 1 in which the means for displaying the diffraction pattern comprises a fluorescence screen arranged along the optical axis on the side of the specimen opposite the said gun.

3. An apparatus as described in claim 1 in which the means for displaying the diffraction pattern comprises a photographic plate.

4. An apparatus as described in claim 1 in which the means for detecting and displaying the diffraction pattern comprises an electron detector, a deflecting means arranged between the specimen and the detector for scanning the diffraction pattern over the detector, and said image display means.

5. An apparatus as described in claim 1 in which the means for detecting and displaying the diffraction pattern comprises a scanning deflecting means for changing the incident angle of the incident beam and thus scanning the diffraction pattern over the electron detector arranged beyond the specimen, and said image display means.

6. A scanning electron microscope according to claim 1 wherein the baffle, and specimen holder are related to the condenser lens closest to the sample by the relation $1/L + 1/S = 1/F_0$, where $f_o$ is the focal length of the lens, $L$ is the distance between the lens plane and the baffle and $S$ is the distance between the lens plane and the specimen.

* * * * *

UNITED STATES PATENT OFFICE
CERTIFICATE OF CORRECTION

Patent No. 3,795,809         Dated March 5, 1974

Inventor(s) SUSUMU TAKASHIMA

It is certified that error appears in the above-identified patent and that said Letters Patent are hereby corrected as shown below:

Column 2 Line 67 --diffractin-- should read --diffraction--.

Claim 6 -
Column 4 Line 47 --$1/F_o$-- should read --$1f_o$--.

Signed and sealed this 13th day of August 1974.

(SEAL)
Attest:

McCOY M. GIBSON, JR.          C. MARSHALL DANN
Attesting Officer             Commissioner of Patents